2,558,814

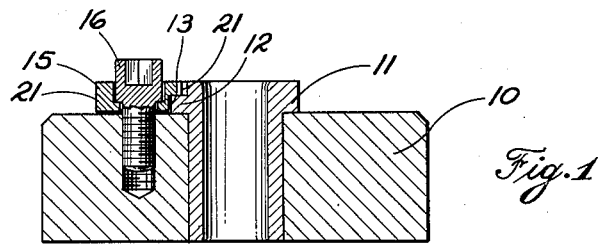
*Fig. 1*
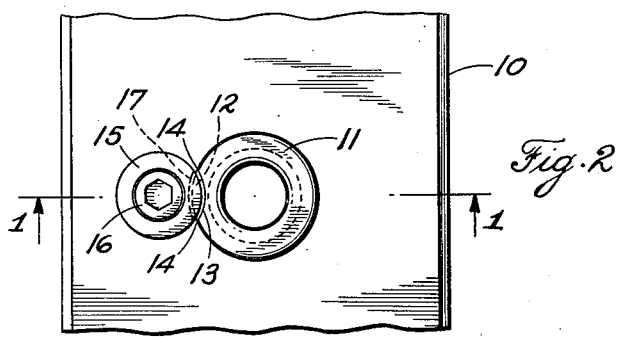
*Fig. 2*
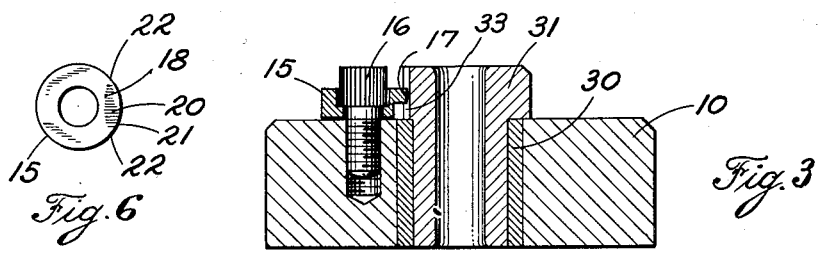
*Fig. 6*  *Fig. 3*
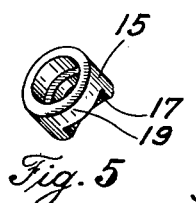
*Fig. 5*
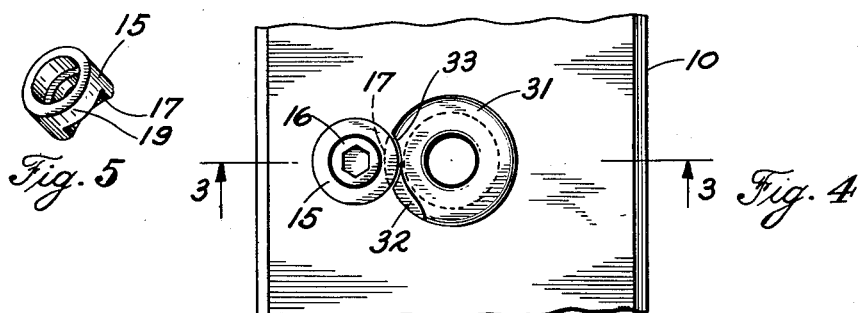
*Fig. 4*
INVENTOR.
OTTIS R. BRINEY
BY Richey & Watts
ATTORNEYS Patented July 3, 1951

UNITED STATES PATENT OFFICE 2,558,814

JIG BUSHING RETAINER

Ottis R. Briney, Pontiac, Mich.

Application January 29, 1949, Serial No. 73,548

2 Claims. (Cl. 77—62)

This invention relates broadly to jig bushings, and, more specifically, to improvements in clamping mechanisms therefor.

Heretofore it has been the practice to retain drill and reamer bushings through the overlapped engagement of the head of a cap screw with a ledge in the circumferential edge of the upper face thereof. In such structure the screws were formed with an enlarged body portion defining a shoulder designed for abutting engagement with the face of the jig or fixture, when the head thereof was seated in the recess defining the ledge in the bushing. The screws were further formed with enlarged circular heads kerfed for the reception of a screw driver, and proportioned for liberal surface engagement with the seat or ledge in the bushing. The ledge, as a general rule, was milled in the circumferential edge of the bushing in complementary configuration to the head of the screw, sufficient clearance being provided to permit ready assembly of the screw, yet delimit excessive rotational movement of the bushing. The length of the shoulder portion of the screw was proportioned relative to the thickness of the ledge to afford slight vertical movement of the bushing, particularly in such installations as were formed with bayonet joint ledges to accommodate the ready interchangeability of the drill and reamer bushings.

In practice, the retaining screws of the type referred to above have been found unsatisfactory and highly objectionable after a jig equipped therewith has been in use for any appreciable period of time. The objections to the cap screw assembly heretofore in use reside in the instability thereof after the jig has been put into service. In such structure the diameter of the enlarged portion of the body is but slightly greater than the crest of the threads in the end section; hence, when the screw is subjected to the torsional strains and vibration transmitted through the bushing, it will loosen, irrespective of the initial tightness of the thread or the compressive effort imposed upon the shoulder defined by the enlarged body of the shank. The reason for such failure is twofold, first, because the bearing face of the shoulder is too small, and, second, because the radial length of the enlarged head forces the screw sidewise as the vertical movement of the bushing caused by the working of the tool is imposed thereon. The screw is subject to the further objection of being too fragile when the bushing is removed. Often when the jig is stored other heavy tools are brought into impinging relation therewith with the result that the enlarged head of the screw is deformed or the slender stem thereof is bent, fractured, or sheared. A still further defect in the cap screw structure resides in the instability thereof when used in jigs or fixtures which are formed from a soft or brittle metal. In such installations the screw thread must of necessity be relatively coarse, consequently the throat of the tapped hole in the jig comprises a relatively wide ledge of helical form which is incapable of resisting the impact and thrust imposed thereon by the narrow bearing face of the shouldered portion of the body of the screw.

In the present invention all of the foregoing defects and objections are eliminated through the provision of a screw which is coordinated with a sleeve of a diameter which will afford an adequate bearing upon the face of the jig, a direct axial bearing with the head of the hold-down screw and ample surface engagement with the ledge in the marginal edge in the bushing.

Additional objects and advantages of the invention reside in the provision of a retaining device that affords double the anchorage against rotation as compared to that heretofore attained; a screw of the type that is formed for use with a bar wrench; a sleeve that may be produced on an automatic screw machine; an assembly that may be used with either a fixed or a removable type of bushing, and a structure which is durable, economic of manufacture, rigid and susceptible of substitution in place of the cap screw heretofore in use.

Other objects and advantages more or less ancillary to the foregoing, and the manner in which all the various objects are realized, will appear in the following description, which, considered in connection with the accompanying drawings, set forth the preferred embodiment of the invention.

In the drawings:

Fig. 1 is a vertical, sectional view through a bushing and the improved holding mechanism assembly;

Fig. 2 is a plan view thereof;

Fig. 3 is a vertical sectional view of a bushing of the removable type and the holding mechanism assembly;

Fig. 4 is a plan view thereof;

Fig. 5 is a view in perspective of the improved bushing retainer; and

Fig. 6 is a plan view of the lower face thereof.

Referring first to Fig. 1, the jig 10 is provided with a drill bushing 11 of the type which is formed with shelf or ledge 12 in the circumferential edge of the flanged head thereof for the reception of a hold-down screw or other clamping mechanism. The ledge is machined in the upper face of the bushing by a circular cutter positioned to form an arcuate wall 13 defining shoulders 14 in the circumferential edge of the flange. The depth of the cut is uniform in fixed bushings of comparable size, but is slightly deeper in removable bushings of the type illustrated in Figs. 3 and 4.

The improved bushing retainer comprises a cylinder 15 bored for the reception of a fillister head screw 16 and counterbored for the seated engagement of the major portion of the head thereof. The screw 16 is preferably of the type that is formed with a hollow head adapted for driving engagement with a bar of polygonal cross-section. The lower face of the sleeve or cylinder 15 is milled with a circular cutter to form a recess 17 defining an arcuate vertical wall 18 that conforms to the contour of the outer face of the ledge 12 in the bushing, a lip 19 embodying a flat horizontal surface 20 engageable with the face of the ledge 12 in the bushing, an arcuate outer face 21 that conforms to the contour of the wall 13 in the bushing and shoulders 22 in the terminating ends of the vertical wall 18. The depth of the recess 17 is slightly less than the thickness of the ledge 12 in the fixed bushing 11 in order to provide a clamping action through the screw, and the height of the cylinder or sleeve 15 is proportioned to afford a liberal wall thickness between the bottom of the counterbore and the lower face of the lip 18. The size of the threaded shank of the fillister head screw used in the improved bushing retainer is preferably the same as that of the flat-headed cap screw heretofore in use and the diameter of the cylinder 15 is likewise preferably equal to the diameter of the head of the cap screw so that the improved assembly may be substituted in jigs and fixtures machined for the former clamping screw.

It will be observed that in the assembled relation of the bushing retainer constituting the present invention the lip 19 is nested in and encompassed by the walls of the bushing that define the ledge 12 and that the body of the bushing that forms the ledge 12 is nested in and fully encompassed by the recess 17 in the cylinder 15. It will be further noted that the shoulders 14 in the bushing engage the side wall of the cylinder and the shoulders 22 in the cylinder engage the side wall of the bushing, thus forming a double stop against rotation and a more efficacious abutment than that provided by the cap screw, since, in the former case the torque was applied at the top of the screw, while in the present invention there is no multiplication of leverage.

The area of the base of the cylinder as provided in the present invention is more than quadruple the area of frictional engagement of the lip of the cylinder with the ledge of the bushing; hence there is but little tendency for the screw to become loosened through movement of the cylinder. The torsional strains imposed through the bushing are further restrained by the compressive effort exerted by the screw 16, since the screw is fully and squarely seated on the shoulder of the counterbore in the cylinder and since lateral movement of the cylinder is also resisted by the side walls of both the shank and head of the screw. The stability of the cylinder is further improved in the structure of the invention through the provision of the relatively small area of engagement of the head of the screw with the shoulder of the counterbore which facilitates application of appreciable torque upon the screw without rotation of the cylinder. The stability of the cylinder is also improved by the direct vertical pressure afforded through the counterbore shoulder, through the high frictional resistance afforded by the base of the cylinder, and through the advantage of the socket head screw and bar type wrench.

In Figs. 3 and 4 the improved retainer is illustrated as associated with an interchangeable bushing assembly. As shown the jig 10 is provided with a liner bushing 30 ground for the reception of either a drill or reamer bushing 31. These bushings are formed in the conventional manner with a ledge 32 similar to the ledge 12 in the fixed bushing and with an arcuate notch 33 intersecting the ledge and disposed throughout the length of the head of the bushing. The radius of the arcuate notch and the center from which it is struck is the same as the center-to-center distance between the axis of the bushing and the axis of the screw. The bushing retainer in this case is identical with that heretofore described in connection with the fixed bushing and the structure of the interchangeable bushings is similar save for the notch 33 as above noted and the thickness of the ledge 32 which in this case is a few thousandths of an inch less to facilitate rotation of the bushing into registration with the lip 18 on the cylinder 15.

Although the recess 17 in the lower face of the center is preferably formed with the arcuate vertical wall 18 as described above, it will be recognized that the lip may be formed with a straight vertical wall of a chordal length consonate the equivalent height of the arc of the lip 19.

From the foregoing it will be recognized that the liberal area of the base of the cylinder and the organization of the screw will safeguard the stability of the assembly, that the retainer is free from overhanging parts of the character that are susceptible of hooked engagement with foreign bodies, that the hold-down cylinder may be anchored with greater rigidity than afforded with the large headed cap screw heretofore in use, and that the interengaged lip and ledge of the cylinder and bushing afford a clamp which is efficacious, durable and rigid.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

I claim:

1. In combination with a jig bushing embodying a cylindrical body having an axial bore therein, and an enlarged head having an arcuate recess in the edge of the upper face thereof, a retainer therefor comprising a cylindrical body having an axial bore therein for the reception of a clamping screw and having an arcuate recess in the edge of the lower face thereof, the circular side wall of the head of the bushing subjacent the arcuate recess therein being seated in the arcuate recess in the edge of the lower face of said retainer to restrain rotational movement of the retainer, and the circular side wall of the retainer superjacent the arcuate recess therein being seated in the arcuate recess in the edge of the upper face of the head of the bushing to restrain rotation of the bushing, and a screw in the bore in said retainer to restrain transaxial movement thereof and effect impingement of the contiguous walls that define the recesses in the bushing and retainer.

2. In combination, a jig bushing having a ledge formed in the upper surface thereof, the back wall of said ledge being arcuate, a clamping mechanism therefor comprising a cylinder having the circumferential surface thereof complimentary with the arcuate rear wall of the said ledge, said cylinder having an axial bore for the reception of a holding screw, a screw in said bore, and an arcuate recess in the lower edge of the cylinder, the radius of the back wall of said recess being equal to the radius of the top of the bushing, said recess defining a lip interengaged with the ledge in the bushing for holding the bushing against vertical movement, said lip cooperating with the back wall of said ledge for securing the bushing against rotation and the bushing cooperating with the back wall of said recess for securing the cylinder against rotation.

OTTIS R. BRINEY.

REFERENCES CITED

The following references are of record in the file of this patent:

UNITED STATES PATENTS

| Number | Name | Date |
| --- | --- | --- |
| 1,024,127 | Gadd | Apr. 23, 1912 |
| 1,062,905 | Gadd | May 27, 1913 |
| 1,213,599 | Dow | Jan. 23, 1917 |
| 1,469,768 | Booth | Oct. 9, 1923 |
| 1,493,442 | Swain | May 6, 1924 |
| 2,451,035 | Marsilius | Oct. 12, 1948 |

OTHER REFERENCES

American Machinist, pg. 720, vol. 45, No. 17, Oct. 26, 1916.

Machinery (Magazine), pg. 216, Jan. 1948.